United States Patent Office 3,072,643
Patented Jan. 8, 1963

3,072,643
9β,11β-OXIDO-Δ⁴-ANDROSTENE-3,17-DIONE
Josef Fried, New Brunswick, N.J., assignor to Olin Mathieson Chemical Corporation, New York, N.Y., a corporation of Virginia
No Drawing. Original application Nov. 18, 1954, Ser. No. 469,848. Divided and this application Mar. 1, 1956, Ser. No. 569,219
1 Claim. (Cl. 260—239.55)

This application is a continuation-in-part of my application Serial No. 343,243, filed March 18, 1953, now abandoned, and a division of my application Serial No. 469,848, filed November 18, 1954.

The compound of this invention comprises a 9β,11β-oxido steroid of the androstane series.

The steroid of this invention can be obtained by employing the corresponding 9β,11β-oxido steroid of the pregnane series as starting material. The steroid of the pregnane series is converted to the 9β,11β-oxido steroid of the androstane series. The 9β,11β-oxido steroid of the androstane series can then be converted to the corresponding 9α-halo, 11β-hydroxy steroid. The latter may then be either dehalogenated to obtain the corresponding known 9-unsubstituted, 11β-hydroxy compounds, or oxidized to obtain the corresponding 9α-halo, 11-keto compounds. The 9α-halo, 11-keto steroid of the androstane series can also be dehalogenated to produce the known 9-unsubstituted, 11-keto compounds.

The 9β,11β-oxido steroid of the pregnane series is prepared by the method disclosed in my applications, Serial No. 343,243, and Serial No. 417,489, filed March 18, 1953, now U.S. Patent No. 2,852,511, and March 10, 1954, respectively, and an application of Fried and Herz, Serial No. 434,672, filed June 4, 1954, now U.S. Patent No. 2,763,671.

The conversion of the 9β,11β-oxido steroid of the pregnane series into the corresponding 9β,11β-oxido steroid of the androstane series is best effected by reacting the former with an oxidizing agent in an acid solution. Suitable oxidizing agents include compounds containing a hexavalent chromic ion (i.e. chromic oxide). Glacial acetic acid may be used as a suitable solvent. The reaction is most desirably conducted at room temperature.

The 9β,11β-oxido steroid of the andrastane series is a very reactive compound and is readily converted into the corresponding 9α-halo, 11β-hydroxy derivatives by treating with agents known to open an epoxy ring under mild conditions. Thus, the ring can be split, inter alia, by hydrohalides such as hydrofluoric acid, hydrochloric acid, hydrobromic acid, and hydroiodic acid to form the corresponding 9α-fluoro-11β-hydroxy, 9α-chloro-11β-hydroxy, 9α-bromo-11β-hydroxy and 9α-iodo-11β-hydroxy derivatives, respectively. These reactions are preferably effected in an organic solvent, such as chloroform, at below room temperature.

The 9α-halo, 11β-hydroxy steroids of the androstane series can be oxidized to the corresponding 9α-halo, 11-keto derivatives by reacting the former with an oxidizing agent such as chromic acid in glacial acetic acid.

The 9α-halo, 11β-hydroxy steroids of the androstane series, as well as the 9α-halo-11-keto steroids of the androstane series, can be dehalogenated to the corresponding 9-unsubstituted, 11β-hydroxy (or 11-keto) steroid by treatment with zinc dust or chromous chloride in a dilute lower alcohol (e.g. ethanol or methanol) or a lower fatty acid (e.g. acetic acid), respectively. By these processes, the novel 9α-halo, 11β-hydroxy (or 11-keto) steroids of the androstane series are converted to the known 11β-hydroxy (or 11-keto) steroids of the androstane series. Thus, the 9α-halo-Δ⁴-androstene-11β-ol-3,17-diones are converted to Δ⁴-androstene-11β-ol-3,17-dione, a known compound; and the 9α-halo-Δ⁴-androstene-3,11,17-triones, which can in turn be produced from the 9α-halo-Δ⁴-androstene-11β-ol-3,17-diones, are converted to andrenosterone (Δ⁴-androstene-3,11,17-trione), a known compound having established testoid activity.

The following examples are illustrative of the invention (all temperatures being in centigrade):

EXAMPLE 1

9β,11β-Oxido-Δ⁴-androstene-3,17-dione from 9β,11β-oxido-Δ⁴-pregnene-17α,21-diol-3,20-dione To a solution of 9β,11β-oxido-Δ⁴-pregnene-17α,21-diol-3,20-dione (190 mg.) in 10 ml. of glacial acetic acid is added portionwise a solution of 190 mg. of chromic acid in 16.5 ml. of glacial acetic acid. After one hour at room temperature 1 ml. of alcohol is added and after an additional 10 minutes, the solution is evaporated to near-dryness. The residue is distributed between 5 ml. water and 20 ml. chloroform, and the resulting chloroform solution extracted with water, dilute sodium bicarbonate and again with water. After drying over sodium sulfate, the chloroform is removed in vacuo and the chloroform residue is crystallized from acetone-hexane affording 9β,11β-oxido-Δ⁴-androstene-3,17-dione having the following properties: M.P. about 180–181° C.; $[\alpha]_D^{23}$ +48° (c., 0.77 in chloroform);

$\lambda_{max.}^{alc.}$ 242 mμ ( $\epsilon$=15,200); $\lambda_{max.}^{Nujol}$ 5.79μ, 6.02μ, 6.06μ, 6.20μ

Analysis. — Calculated for $C_{19}H_{24}O_3$ (300.38): C, 75.97; H, 8.05. Found: C, 75.71; H, 8.31.

9β,11β-oxido-Δ⁴-androstene-3,17-dione can then be converted to a 9α-halo, 11β-hydroxy-Δ⁴-androstene-3,17-dione by reacting the former with a hydrogen halide as illustrated by the following examples:

EXAMPLE 2

9α-Bromo-Δ⁴-Androstene-11β-Ol-3,17-Dione From 9β,11β-Oxido-Δ⁴-Androstene-3,17-Dione To a solution of 25.1 mg. of 9β,11β-oxido-Δ⁴-androstene-3,17-dione in 0.5 ml. of glacial acetic acid and 0.5 ml. of carbon tetrachloride is added at room temperature 0.04 ml. of 30% hydrobromic acid in glacial acetic acid. After 10 minutes, 10 ml. of chloroform is added, and the mixture is extracted with dilute sodium bicarbonate and with water. The chloroform solution is dried over sodium sulfate, evaporated to dryness in vacuo and the residue of 9α-bromo-Δ⁴-androstene-11β-ol-3,17-dione is crystallized from acetone.

EXAMPLE 3

9α-Bromo-Δ⁴-Androstene-3,11,17-Trione From 9α-Bromo-Δ⁴-Androstene-11β-Ol-3,17-Dione 16.0 mg. of 9α-bromo-Δ⁴-androstene-11β-ol-3,17-dione is oxidized with 6.8 mg. of chromic acid as described in Example 1. The residue from the chloroform extract upon crystallization from 95% ethanol furnishes pure 9α-bromo-Δ⁴-androstene-3,11,17-trione.

EXAMPLE 4

Andrenosterone From 9α-Bromo-Δ⁴-Androstene-3,11,17-Trione

To a solution of 10 mg. of 9α-bromo-Δ⁴-androstene-3,11,17-trione in 2 ml. of glacial acetic acid is added at steam bath temperature a total of 45 mg. of zinc dust. Additions are made portion-wise and the reaction is interrupted after 15 minutes. The residual zinc is removed by centrifugation, and the acetic acid solution is evaporated to dryness in vacuo. The residue is taken up in 3 ml. of water and 15 ml. of chloroform. After separation of the resulting layers, the chloroform solution is washed with water, dilute sodium bicarbonate and again with water; and after drying over sodium sulfate the solution is evaporated to dryness. The residue after two crystallizations from 95% alcohol, yields crystals, M.P. 222–224° C., which do not depress the melting point of authentic andrenosterone. Furthermore, the infrared spectrum of this produce is identical with that of andrenosterone.

I claim:

9β,11β-oxido-Δ⁴-androstene-3,17-dione.

References Cited in the file of this patent

UNITED STATES PATENTS

| | | |
|---|---|---|
| 2,602,769 | Murray et al. | July 8, 1952 |
| 2,734,897 | Chemerda | Feb. 14, 1956 |

FOREIGN PATENTS

| | | |
|---|---|---|
| 1,056,102 | France | Oct. 21, 1953 |

OTHER REFERENCES

Reich et al.: Helv. Chim. Acta, vol. 30, pages 329–334 (1947).

Lieberman et al.: J. Biol. Chem., vol. 196, pages 793–805 (1952).

Cole et al.: J. Am. Chem. Soc., vol. 74, pages 5571–5 (1952).

Heusser et al.: Helv. Chim. Acta, vol. 35, pages 295–307 (1952).